Sept. 24, 1957 R. B. CLENDENIN 2,807,686
AUTOMATIC CONTROL SWITCH
Filed Jan. 3, 1955 2 Sheets-Sheet 1
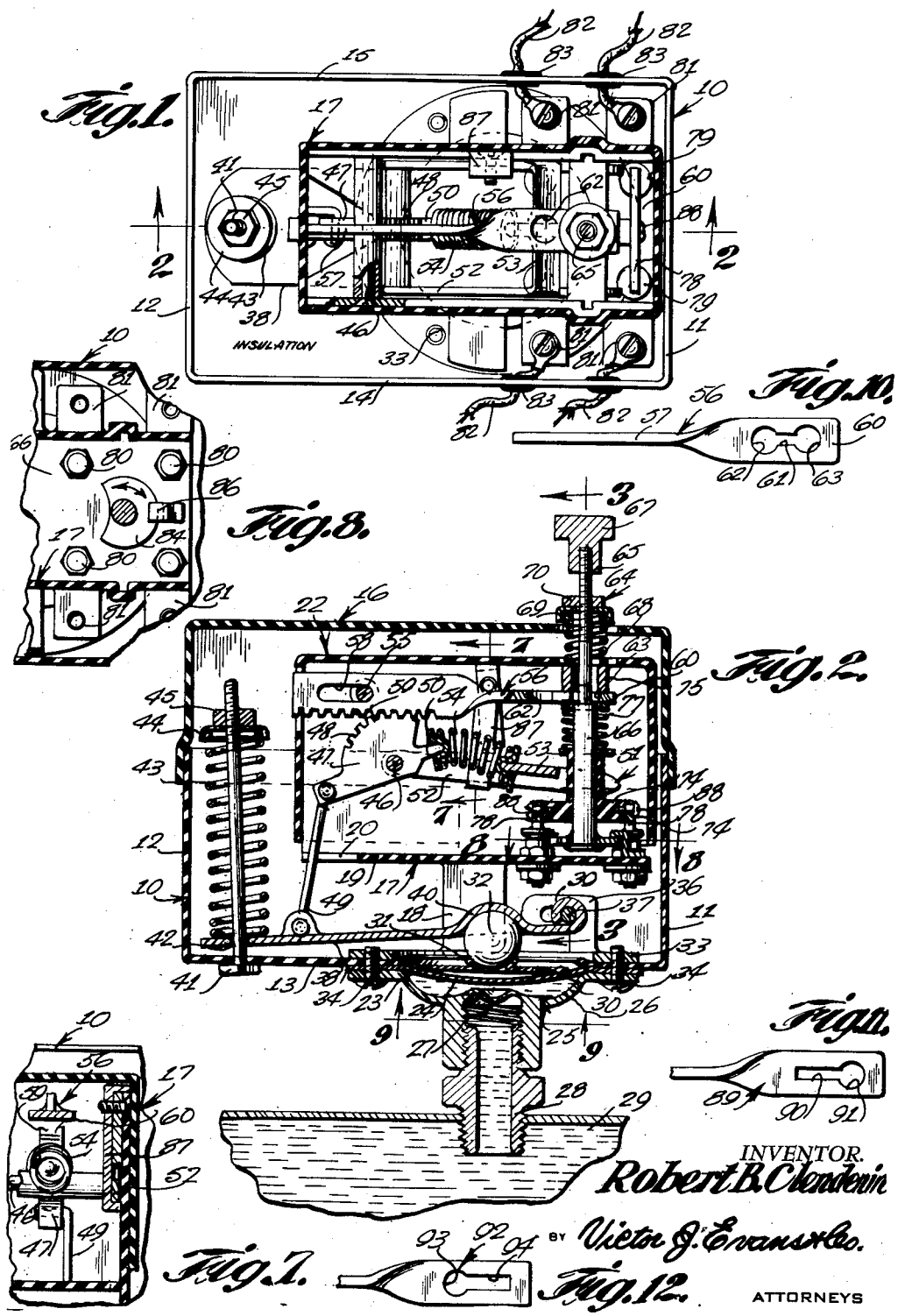
INVENTOR.
Robert B. Clendenin
BY Victor J. Evans & Co.
ATTORNEYS

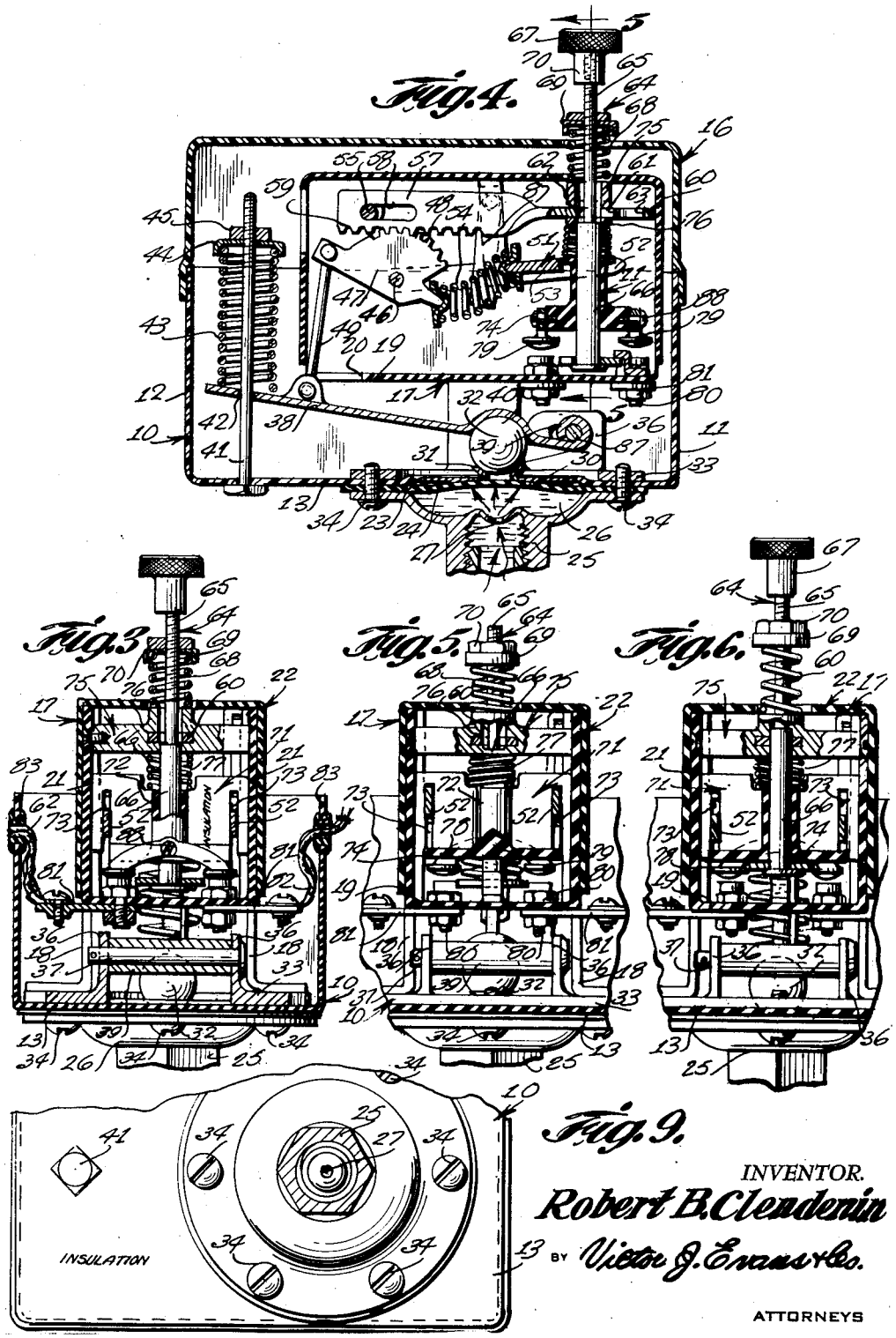

United States Patent Office 2,807,686
Patented Sept. 24, 1957

2,807,686
AUTOMATIC CONTROL SWITCH
Robert B. Clendenin, Franklin, Ohio
Application January 3, 1955, Serial No. 479,484
4 Claims. (Cl. 200—83)

This invention relates to a switch, and more particularly to a switch for automatically controlling the operation of a pump motor.

This invention is an improvement over the automatic control switch shown and described in my co-pending application, Serial No. 445,968.

The object of the invention is to provide an automatic control switch which will serve to de-energize a fluid pump such as a water pump by breaking the circuit to the motor when the water or other fluid decreases below a predetermined level so that there will be no damage to the pump resulting from the pumping in a dry line.

A further object of the invention is to provide an automatic control switch which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a horizontal sectional view taken through the switch, and with the cover or lid of the housing removed.

Figure 2 is a sectional view taken on the line 2—2 of Figure 1.

Figure 3 is a sectional view taken on the line 3—3 of Figure 2.

Figure 4 is a view similar to Figure 2, but showing the parts shifted as when there is increased water pressure in the system.

Figure 5 is a sectional view taken on the line 5—5 of Figure 4.

Figure 6 is a view similar to Figure 5, but showing the plunger in a shifted position.

Figure 7 is a sectional view taken on the line 7—7 of Figure 2.

Figure 8 is a sectional view taken on the line 8—8 of Figure 2.

Figure 9 is a sectional view taken on the line 9—9 of Figure 2.

Figure 10 is an elevational view of the bar which is positioned in the casing.

Figure 11 is a view similar to Figure 10 but illustrating a modified bar for cutting out on low pressure.

Figure 12 is a view similar to Figures 10 and 11 but showing a still further modified bar for cutting out on high pressure.

Referring in detail to the drawings, the numeral 10 designates a hollow housing which is adapted to be made of a suitable insulated material, and the housing 10 includes spaced parallel end walls 11 and 12, and spaced parallel side walls 14 and 15. The housing 10 further includes a horizontally disposed bottom wall 13, and detachably mounted on the housing 10 is a cover or lid which is indicated generally by the numeral 16.

Positioned within the housing 10 is a hollow casing 17 which is also made of insulating material, and the casing 17 may be supported by legs 18. The casing 17 includes a bottom wall 19 which is provided with a cutout 20, and extending upwardly from the bottom wall 19 is a pair of spaced parallel side walls 21. A cover or lid 22 of insulating material is mounted on the casing 17.

The bottom wall 13 of the housing 10 is provided with an opening 23, and extending across the opening 23 is a flexible diaphragm 24 which can be made of any suitable flexible material. A bracket 25 includes a recessed portion 26, and the bracket 25 is further provided with a central aperture 27 through which water or other fluid can pass in order to actuate the switch of the present invention. A fitting 28 serves to connect the bracket 25 to a suitable line or tank 29 which may have water or other fluid therein, as shown in Figure 2.

Arranged on the opposite side of the diaphragm 24 from the bracket 25, is a base 30, and the base 30 is provided with a central seat 31 which receives therein a ball 32. A ring member 33 is arranged adjacent the inner surface of the bottom wall 13, and suitable securing elements such as bolt and nut assemblies or screws 34 extend through the wall 13, diaphragm 24, and ring member 33 for maintaining these parts in their proper assembled relation.

Extending upwardly from the ring member 33 and secured thereto or formed integrally therewith is a pair of spaced parallel apertured ears 36 which support a pin 37. A lever 38 has a curved portion 39 pivotally mounted on the pin 37, and the lever 38 is provided with an offset portion 40 which engages a portion of the ball 32. A suitable securing element such as a bolt 41 extends through the bottom wall 13, and through an aperture 42 in the lever 38. A coil spring 43 is circumposed on the bolt 41, and the coil spring 43 abuts a stop member 44 which is maintained in place on the bolt 41 by means of a nut 45. Thus, by adjusting the nut 45, the position of the stop member 44 can be varied or adjusted, whereby the tension of the coil spring 43 can be varied so that the amount of pressure necessary to move the lever 38 can be controlled.

Supported by the casing 17 is a pin 46 which has a sector plate 47 rockably or pivotally mounted thereon. The sector plate 47 is provided with a plurality of teeth 48, and a link 49 extends between the plate 47 and the lever 38 so that as the lever is actuated the plate 47 will likewise move. A finger 50 projects from the plate 47, and positioned in the casing 17 is a support member 51 which includes a pair of spaced parallel arms 52 that are pivotally mounted on the pin 46. A plate 53 extends between the arms 52 and is secured thereto, and a coil spring 54 extends between the plate 53 and the finger 50.

Also positioned in the casing 17 is a pin 55 which provides a support for a bar 56, and the bar 56 includes a pair of portions 57 and 60 which are arranged at right angles with respect to each other. The portion 57 is provided with a slot 58 through which extends the pin 55 and the portion 57 is also provided with teeth 59 which mesh with the teeth 48 of the sector plate 47. Thus as the plate 47 rocks back and forth the bar 56 will be shifted back and forth. The other portion 60 of the bar 46 is provided with a slot 61 that has its ends terminating in enlarged cutouts 62 and 63, Figure 10.

The switch of the present invention further includes a plunger 64 which is movably mounted in the casing and housing, and the plunger 64 includes an upper section 65 and a lower section 66 which is of greater diameter than the upper section 65. A knob 67 is arranged in threaded engagement with the part 65, and the knob 67 is adapted to be manually engaged when the plunger is to be actuated. A coil spring 68 is circumposed on the upper section 65, and the coil spring 68 abuts a stop member 69 which is held in place by a stop nut 70.

Positioned in the casing 17 is a body member 71 which is adapted to be made of electrically non-conductive material, and the body member 71 includes a cylindrical collar or sleeve 72 which slidably receives therein the lower portion 66 of the plunger 64. The body member 71 is further provided with slots 73 through which extend the arms 52 of the support member 51, Figures 3, 5 and 6. Formed integrally with the bottom of the body member 71 or secured thereto is a flat portion 74. A bracket 75 is secured within the casing 17, and the bracket 75 is provided with a slot 76 which slidably receives the portion 60 of the bar 56. A coil spring 77 is interposed between the bracket 75 and the body member 71. Secured to the bottom of the flat portion 74 is a pair of spaced parallel metal strips 78 which each has a pair of contacts 79 connected thereto, and the contacts 79 are mounted for movement into and out of engagement with contacts 80 which project upwardly from the bottom wall 19. Conducting strips 81 extend outwardly from the contacts 80, and wires 82 are connected to the strips 81, the wires 82 extending through grommets 83 in the side walls of the housing 10, Figure 3. These wires 82 may be connected to a suitable source of electrical energy and to a conventional pump motor so that the circuit can be arranged so that when fluid pressure in the system 29 decreases below a predetermined level, then the electrical circuit to the pump motor will be broken whereby the pump will not operate when the system is dry so as to prevent damage to the pump.

From the foregoing it is apparent that there has been provided an automatic control switch which is an improvement over the switch shown and described in my co-pending application. The switch of the present invention is especially suitable for use in stopping the operation of a pump motor when the fluid pressure in a system such as the system 29 decreases. Thus, when the pressure in the system 29 decreases the diaphragm 24 will move from the position shown in Figure 4 to the position shown in Figure 2 and this will cause corresponding movement of the other parts. Thus, the ball 32 and lever 38 will move downwardly and the snap spring 54 will cause the sector plate 47 to be retained immobile in either the position shown in Figure 2 or the position shown in Figure 4. When the lever 38 moves to the position shown in Figure 2 the sector plate 47 is pivoted in a counterclockwise direction about the pin 46 and this causes movement of the bar 56 from right to left since the teeth 59 and 48 are in mesh. With the parts in the position shown in Figure 2 the electrical circuit will be shorted to the pump motor or interrupted so that operation of the pump motor will stop so that there will be no danger of the pump seals becoming damaged from dry pumping. When pressure in the system 29 again builds up, the ball and lever will move from the position shown in Figure 2 back to the position shown in Figure 4 and the plunger 64 can be manually reset by means of the knob 67. There is further provided a means for maintaining the plunger 64 locked in its down position, and this means comprises a shoulder 84 on the lower end of the plunger, and the shoulder 84 is provided with a cutout 85, Figure 8 which must register with a lug 86 if the plunger 64 is to move upwardly. A guide strip 87 helps to maintain one of the arms 52 in its proper position as it moves back and forth, Figure 7.

The switch of the present invention is especially suitable for jet pumps which have a working pressure of approximately twenty pounds per square inch in the pump before the water enters the water lines. As long as the water supply to the pump is sufficient to supply the pump with full capacity, the switch operates as a normal switch. However, in the event a control float sticks or any other circumstances arise to prevent normal passage of water, the switch will automatically cutout when the water source fails or if the pressure becomes excessive. The locking member 84 has a portion thereof cut away as shown in Figure 8 so that there will be the cutout 85 which permits unlocking of the plunger when the cutout 85 registers with the lug 86. A suitable arrow can be arranged on the knob 67 to indicate various positions of the knob and plunger such as release position or breaking contact position. The contacts 79 are arranged in pairs, and each strip 78 carries a pair of the contacts 79. The pair of strips 78 may be pivotally connected to the portion 74 by suitable pivot pins or screws 88. Thus, the strips 78 can rock or pivot slightly to compensate for any variation in the contact points.

The switch of the present invention requires a minimum amount of adjustment and will not readily get out of order. Various types of tripping bars can be used, as for example the tripping bar 56 of Figure 10 can be used when the switch is to be arranged to cutout on a high or low pressure in the line or tank 29. The bar 89 of Figure 11 can be used when the switch is to cutout on a low pressure, and the bar 89 can be used in lieu of the bar 56. The bar 89 is provided with an elongated slot 90 which communicates with an enlarged cutout 91. Instead of using the bar 56 or the bar 89, the bar 92 of Figure 12 can be used when the switch is to cutout on a high pressure. The bar 92 is provided with a slot 94 which communicates with an enlarged cutout 93. Due to the provision of the enlarged circular cutouts 63, 91 and 93 in these bars, the plunger will be able to move therethrough when the plunger registers with the enlarged openings 63, 62, 91 or 93 so as to permit upward movement of the plunger and opening of the contact points and breaking of the circuit. However, when the section 65 of the plunger is extending through the slots 61, 90 or 94, then the upper portion of the section 66 abuts the lower surface of the bar to maintain the plunger down and the circuit closed. These bars may be provided with oil wicks to insure proper lubrication of the parts.

The strip 87 serves as a stop for the arms 52 so that on the down stroke of the arm 52, the plunger 64 can raise the contact point sufficiently to break contact or to break the circuit to the motor without requiring the spring 68 to lift the additional down pressure of the spring 54. The spring 68 counteracts or opposes the action of the spring 77 and the pressure exerted by the spring 77 is quite small and is used only for holding the contact points together. The inner strip which provides a stop for the arm 52 on the upstroke of the arm, also permits or provides that a differential setting can be made to permit the pump to start at around 20 pounds per square inch or any other predetermined pressure.

In operation, to start the switch, it is only necessary to press down on the knob 67 for approximately 30 seconds, with the arrow on the knob 67 pointing to "Safety." Then, the knob 67 is released and the pump will operate if it is a jet type pump. For other types of pumps, the knob 67 can be turned to the safety position as indicated by a suitable arrow, and then the knob 67 is depressed and turned to "Off" position until the pump pressure reaches 20 pounds per square inch, and then the knob 67 is rotated back to "On" position. To reset the switch, it is necessary to first correct the cause or fault that caused breaking of the circuit, and then follow the previous instructions for starting. The contacts can be connected to a suitable source of electrical energy and to the pump motor, and due to the provision of the plurality of contacts, both wires leading to a pump motor will be interrupted at the same time when the switch is actuated.

I claim:

1. In an automatic control switch, an insulated housing including a bottom wall, spaced parallel end walls and spaced parallel side walls, an insulated cap mounted on said housing, an insulated casing arranged in said housing and including spaced parallel side walls, a cover mounted over said casing, there being an opening in the bottom of said housing, a diaphragm extending across said opening, a body member secured to said housing and including a recessed portion provided with a central aperture, a bushing depending from said body member, a movable base arranged contiguous to said diaphragm and provided with a central seat, a ball positioned in said seat, a ring member secured to the bottom wall of said housing and having a pair of apertured ears extending therefrom, a first pin extending between said pair of ears, a lever having a curved portion pivotally mounted on said pin and including an offset portion for engagement with said ball, a securing element extending through the bottom wall of said housing and through said lever, a stop member adjustably mounted on said securing element, a coil spring abutting said stop member and circumposed on said securing element, a second pin supported by said casing, a sector plate rockably mounted on said second pin and provided with a plurality of teeth, a link pivotally connecting said sector plate to said lever, a finger extending from said sector plate, a support member including a pair of spaced parallel arms pivotally mounted on said second pin, a plate extending between said pair of arms and secured thereto, a coil spring interposed between said plate and said finger, a bar including a first portion provided with teeth engaging the teeth of said sector plate, a second portion extending from said first portion and arranged at right angles with respect thereto, there being a slot in the second portion of said bar, and said slot having its ends terminating in enlarged cutouts, a plunger movably mounted in said housing and including an upper portion projecting through said slot and a lower portion of greater diameter than said upper portion, a knob on the upper end of said plunger, a stop member mounted on said plunger, a coil spring circumposed on the upper portion of said plunger and abutting said stop member, a cylindrical sleeve of insulating material slidably receiving the lower portion of said plunger, an insulated flat portion on the lower end of said sleeve, a pair of spaced parallel contact strips secured to said flat portion, first contacts connected to said strips, and second contacts projecting upwardly from the bottom wall of said housing for engagement by said first contacts.

2. The structure as defined in claim 1, and further including a locking mechanism for maintaining the plunger in its downward position.

3. The structure as defined in claim 1, and further including a locking mechanism for retaining the plunger in its downward position, said locking mechanism comprising a lug, and a shoulder on the lower end of said plunger provided with a cutout for movement into and out of registry with said lug.

4. An automatic control switch including a fitting, a housing affixed to said fitting and having an opening communicating therewith, a diaphragm extending across said opening, a lever pivotally mounted in said housing adjacent said opening and having an offset portion formed therein, a movable base plate mounted on said diaphragm and having a centrally disposed seat, a ball interposed between said seat and said offset portion, a pair of fixed electrical contact members mounted in said housing, a pair of movable electrical contact members mounted in said housing, and means interconnecting said lever and said movable contact members for moving the latter, said last-mentioned means including a plunger slidably mounted in said housing and carrying said movable contact members, spring means normally urging said movable contacts out of engagement with said fixed contacts, a latch for maintaining said fixed and movable contacts in engagement against the action of the spring means, a rack slidably mounted in said housing and formed integrally with said latch and extending substantially at right angles to said plunger, a segmental gear enmeshed with said rack and pivotally mounted in said housing, and a link interconnecting said gear and said lever.

References Cited in the file of this patent

UNITED STATES PATENTS

| | | |
|---|---|---|
| 975,420 | Harris | Nov. 15, 1910 |
| 2,182,450 | Clarkson | Dec. 5, 1939 |
| 2,300,530 | Swingle | Nov. 3, 1942 |
| 2,307,731 | Rickmeyer | Jan. 5, 1943 |
| 2,445,756 | Bean | July 27, 1948 |
| 2,692,922 | Millsap | Oct. 26, 1954 |
| 2,718,565 | Ruffle | Sept. 20, 1955 |